May 14, 1929.  K. TOKITA  1,712,485
VEHICLE LIFT
Filed Aug. 6, 1928
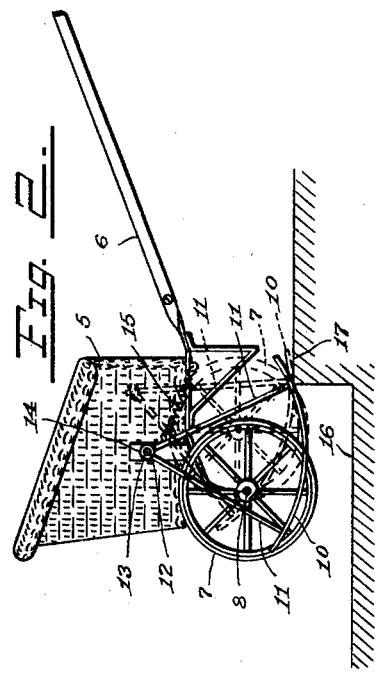
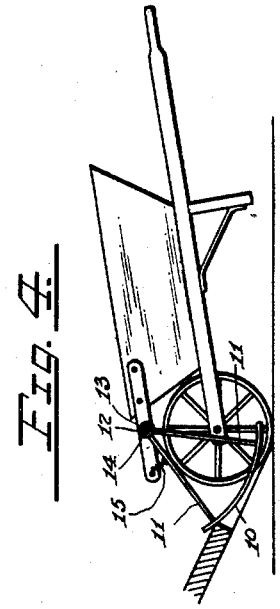
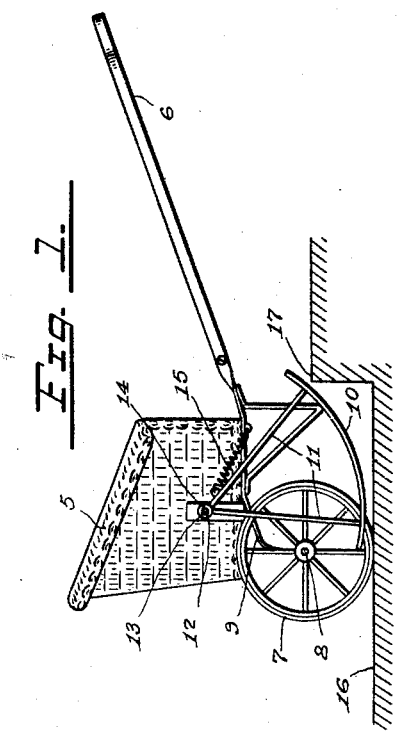
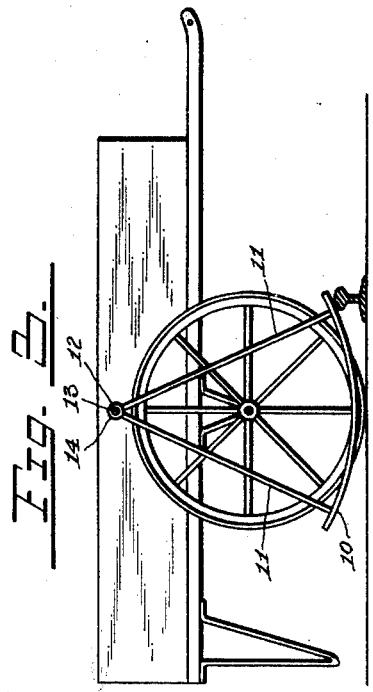
Inventor
Kamekichi Tokita
By G. Ward Kemp
Attorney Patented May 14, 1929.

1,712,485

UNITED STATES PATENT OFFICE.

KAMEKICHI TOKITA, OF SEATTLE, WASHINGTON.

VEHICLE LIFT.

Application filed August 6, 1928. Serial No. 297,641.

This invention relates to vehicle lifts, and particularly to devices for lifting manually operated vehicles to higher elevations or over obstructions.

In the operation of baby perambulators, baggage trucks, wheelbarrows and other vehicles which must frequently be raised to higher elevations, difficulty is met in so doing, as in raising the same from street levels to higher sidewalks etc., or over obstructions.

It is therefore an object of this invention to provide levers attached to curved shoes, the levers pivotally attached to the vehicle and which will readily lift the vehicle when moved forward against an obstruction.

A further object is to provide for such vehicles, one or more shoes, in form of segments of a circle with a greater radius than the wheels of the vehicle, the shoes suspended from a point on the vehicle higher than the axle thereof by levers, the levers rigidly attached to the segment, and pivotally attached to the vehicle.

A still further object is to provide one or more shoes suspended by one or more levers or rods from a pivotal connection on the vehicle higher than the axle thereof, the ends of the shoe up curved and held normally in front of the vehicle wheels, and above the level on which the wheels operate, so that as the vehicle is moved forward, the projecting end of the shoe will contact with the obstruction and there remain while the vehicle is moved over or upon the obstruction, and when the wheels have been advanced beyond or upon the higher level, the shoe is automatically released from the obstruction and is brought to its normal position by a spring or other suitable means.

With these and other objects, as may be hereinafter shown, I have illustrated my invention by the accompanying drawings, of which, Figure 1 is a side elevation of a baby cart with the lifting apparatus adapted thereto, with the lifting foot in normal position, and about to contact with a higher level;

Figure 2 is a similar view of the same objects, but showing the foot in contact with the higher level, and the wheels elevated above the lower level, with dotted lines showing the changed position of the lifting apparatus, when the wheels have been raised and brought forward ready to engage the higher level;

Figure 3 is an embodiment of the apparatus for lifting the wheel of an ordinary wheel-barrow over or upon a block or plank;

Figure 4 is an embodiment of the lifting apparatus on a baggage truck, with the foot resting against a T-rail immediately before the wheel is raised.

Like numerals on the different figures represent like parts.

5, represents any baby cart, with an ordinary tongue or handle 6, mounted on wheels 7, revolving on an axle 8, attached to an extension frame 9 of the cart.

10, represents the lifting foot or shoe, with the under face thereof in convex form, and normally held suspended so that its lowest point is slightly above the base of the wheels by means of rods or levers 11, 11, preferably rigidly attached to opposite ends of the shoe, and extending up to a point on the vehicle higher than the axle thereof, and there held on a pivot pin 12, which operates through a hole or journal bearing 13 in the flattened and connected ends 14 of the levers. In vehicles which are generally moved forward, the shoe is normally held with one end projected forward of the wheels by some resilient means, as a spring 15 connecting the front lever to the frame. But in the case of a vehicle to be moved in both directions, the spring is omitted, as in Figure 3, so that either end of the shoe may be in position to contact with an obstruction, and lift the wheel thereover.

In vehicles where the shoe is designed to extend equally both in front and behind the wheels, the supporting pivot pin 12 is placed perpendicularly above the axle, but in the other forms where the shoe is designed primarily to extend only in front of the wheels the pivot is preferably placed above and forward the position of the axle.

The lifting levers are provided of greater length than the spokes of the wheels, and thus furnish a longer leverage than is given by the wheels, for lifting the vehicle over an obstruction or upon any higher level. The lower face of the shoe is preferably in form of a segment of a circle with greater radius than that of the wheels, so that when the extending end of the shoe contacts with any object, it will come to rest thereon, and as the operator moves the vehicle forward, it is elevated by the levers till the wheels are brought into contact with the top of the object, and they then roll over or upon the object or higher lever, while the shoe automatically assumes its normal position.

In Figure 1 the cart is shown on a street pavement or house floor 16, with a higher walk or step 17 in front of the projecting shoe 10, and Figure 2 shows the changed positions of the cart and shoe as the operator moves the vehicle forward, till the wheel is brought into contact with the higher level, as illustrated by the dotted lines.

While I have described the apparatus as primarily for lifting a vehicle to a higher level, and over obstacles, as up stairways, yet it is of great advantage in lowering such vehicles down from a higher to lower levels, the action of the shoe and levers in such cases being to support the vehicle while the wheels are gradually lowered from the higher to the lower level.

I do not limit my invention to the specific construction shown, but desire to provide various modifications within the spirit thereof.

Having described my invention, I claim as new:

1. An apparatus for lifting vehicles over obstructions, with swinging shoes suspended alongside the vehicle wheels, rigid levers connected with the shoes at their lower ends, and the tops of the levers pivotally attached to the vehicle at points thereon higher than the axles thereof, the lifting shoes in form of segments of circles with radii greater than that of the vehicle wheels, the base of the shoes held higher than the base of the wheels, so that the wheels may be moved forward while the shoes remain in fixed positions against obstructions, resilient means for normally holding the front ends of the shoes forward of the front of the wheels and for drawing the shoe forward after the obstruction has been passed.

2. In a wheeled vehicle, with lifting shoes held parallel with and alongside of the vehicle wheels, the lower surface of the shoes in convex form, rods extending upward from the shoes for holding the same at predetermined distances above the base of the wheels, the tops of the rods pivotally attached to the vehicle at points above the plane of the axle thereof, to permit the shoes to swing parallel with the wheels, resilient means for normally holding the front ends of the shoes toward the front of the wheels, and to permit the shoes to remain against an obstruction while the wheels and vehicle are being elevated by the levers and moved forward.

In testimony whereof I affix my signature.

KAMEKICHI TOKITA.